(12) United States Patent
Kuroda et al.

(10) Patent No.: US 10,753,953 B2
(45) Date of Patent: Aug. 25, 2020

(54) AUTOMATED ANALYZER AND LIQUID RESERVOIR

(71) Applicant: HITACHI HIGH-TECHNOLOGIES CORPORATION, Tokyo (JP)

(72) Inventors: Reika Kuroda, Tokyo (JP); Kenta Imai, Tokyo (JP); Yukinori Sakashita, Tokyo (JP); Yoshihiro Yamashita, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 197 days.

(21) Appl. No.: 15/550,095

(22) PCT Filed: Jan. 7, 2016

(86) PCT No.: PCT/JP2016/050403
§ 371 (c)(1),
(2) Date: Aug. 10, 2017

(87) PCT Pub. No.: WO2016/136290
PCT Pub. Date: Sep. 1, 2016

(65) Prior Publication Data
US 2018/0011121 A1 Jan. 11, 2018

(30) Foreign Application Priority Data

Feb. 24, 2015 (JP) .................... 2015-033878

(51) Int. Cl.
*B65G 1/137* (2006.01)
*G01C 21/30* (2006.01)
(Continued)

(52) U.S. Cl.
CPC .............. *G01N 35/10* (2013.01); *B01L 3/508* (2013.01); *G01N 35/02* (2013.01); *G01N 35/026* (2013.01);
(Continued)

(58) Field of Classification Search
None
See application file for complete search history.

(56) References Cited

U.S. PATENT DOCUMENTS

2013/0199454 A1 8/2013 Lipscomb
2016/0334432 A1* 11/2016 Miyazaki ........... G01N 35/1004

FOREIGN PATENT DOCUMENTS

GB 429205 A 1/1935
JP 61-161254 U 10/1986
(Continued)

OTHER PUBLICATIONS

International Preliminary Report on Patentability received in corresponding International Application No. PCT/JP2016/050403 dated Aug. 24, 2017.
(Continued)

*Primary Examiner* — Kathryn Wright
(74) *Attorney, Agent, or Firm* — Mattingly & Malur, PC

(57) ABSTRACT

Provided are an automated analyzer for analyzing a substance contained in an unknown sample and a liquid reservoir, the analyzer and the reservoir being capable of saving users' operation without remarkably increasing the number of components. A flow path outlet of an overflow portion of the liquid reservoirs projects closer to the inner circumferential side of a drain flow path than to an inner circumferential surface side of an outer wall of the drain flow path serving as a destination to which liquid overflows. In addition, the flow path outlet projects so as to come into contact with an outer wall of the inner pipe. The flow path outlet of the overflow portion projects into the drain flow path so as to be located below an upper end of the outer wall of the drain flow path.

5 Claims, 12 Drawing Sheets

(51) Int. Cl.
  *G05D 1/00* (2006.01)
  *G05D 1/02* (2020.01)
  *G01N 35/10* (2006.01)
  *G01N 35/02* (2006.01)
  *B01L 3/00* (2006.01)

(52) U.S. Cl.
  CPC ..... *G01N 35/1002* (2013.01); *G01N 35/1004* (2013.01); *B01L 2200/06* (2013.01); *B01L 2300/0851* (2013.01); *B01L 2300/0858* (2013.01)

(56) References Cited

FOREIGN PATENT DOCUMENTS

| | | |
|---|---|---|
| JP | 62-228951 A | 10/1987 |
| JP | 02-045763 A | 2/1990 |
| JP | 02-057174 U | 4/1990 |
| JP | 08-043274 A | 2/1996 |
| WO | 2013/125536 A1 | 8/2013 |
| WO | WO-2015111469 A1 * | 7/2015 |

OTHER PUBLICATIONS

International Search Report of PCT/JP2016/050403 dated Mar. 15, 2016.
Japanese Office Action received in corresponding Japanese Application No. 2017-501964 dated Jun. 4, 2019.

* cited by examiner

AUTOMATED ANALYZER AND LIQUID RESERVOIR

TECHNICAL FIELD

The present invention relates to an automated analyzer for analyzing a substance contained in an unknown sample (sample) and to a liquid reservoir, and particularly to an automated analyzer provided with liquid reservoirs (reservoirs) for temporarily storing a measurement buffer liquid and a cleaning liquid.

BACKGROUND ART

As an example of an automated analyzer such that the speed of replacement of liquids in liquid reservoirs can be enhanced and preparation time for analysis can be shortened to enhance the speed of a process, there is the invention disclosed in Patent Document 1.

Specifically, Patent Document 1 describes an automated analyzer including an aspiration nozzle, a liquid transfer syringe, an aspiration flow path interconnecting the aspiration nozzle and the liquid transfer syringe, a flow cell provided in the course of the aspiration flow path, a detector for sample analysis which is provided in the flow cell, a reaction assistance liquid reservoir and a cleaning liquid reservoir for storing liquids to be aspirated by the aspiration nozzle, means for supplying a diluting fluid to these reservoirs, a cleaning tank for discarding residual liquids remaining in the reservoirs, and a control unit by which at the time of discharging the residual liquid from the reservoir, a diluting fluid is supplied into the reservoir, thereafter the diluted residual liquid is aspirated into the flow cell through the aspiration nozzle, and the aspirated residual liquid is discharged into the cleaning tank.

PRIOR ART DOCUMENT

Patent Document

Patent Document 1: International Publication No. WO 2013/125536

SUMMARY OF THE INVENTION

Problem to be Solved by the Invention

In analytical fields of clinical examination, life science and the like, automated analyzers in which analytical steps are automated for efficient analysis of a substance contained in an unknown sample (sample) are widely known. For example, there is known an automated analyzer on which a flow cell type detector is mounted, such as the one disclosed in Patent Document 1.

In such an automated analyzer, a structure in which an aspiration nozzle for aspirating liquid is connected to the detector is provided, and a series of analytical cycle operations are conducted while sequentially transferring a sample solution, a cleaning liquid and the like to the detector by way of the aspiration nozzle. In addition, for the purpose of effectively carrying out the analytical cycle operations, a structure is provided in which the liquids such as the cleaning liquid are temporarily kept in custody in liquid reservoirs (reservoirs) prepared separately from bottles and accessibility of the aspiration nozzle to the liquids at the time of liquid aspiration is thereby enhanced.

In Patent Document 1, there is disclosed an automated analyzer having a configuration such that a diluting fluid can be added to the liquid reservoir and can be let overflow, for enhancing the efficiency of an operation of replacing the liquid in the aforementioned liquid reservoir at the time when the liquid has been deteriorated.

In a specific configuration in the aforementioned Patent Document 1, in the case of using a configuration in which a cleaning liquid discharge port is provided directly below a flow path outlet of an overflow portion, it has been necessary to newly prepare a flow path member of a cleaning liquid supply system. In addition, in the case of using a liquid reservoir provided with a discharge flow path, it has been necessary to newly prepare a flow path member of a discharge system. The addition of these novel flow path systems is means that causes an increase in the number of components of the analyzer, leading to an increase in the number of causes of potential troubles in the analyzer and to an increase in the size of the analyzer. From the foregoing, there has been a need, in the method involving an overflow of a diluting fluid, for a contrivance for saving the users' labor at the time of operation, inclusive of the time of maintenance such as cleaning and replacement, without need to increase the number of components conspicuously.

According to the present invention, there are provided an automated analyzer for analyzing a substance contained in an unknown sample (sample) and a liquid reservoir, the automated analyzer and the liquid reservoir being capable of saving the users' labor during operation, without need to increase the number of components conspicuously.

Means for Solving the Problem

To solve the above problem, for example, the configurations described in the claims are adopted.

While the present invention includes a plurality of means for solving the above problem, one example of the means resides in an automated analyzer including: a liquid reservoir installed in the automated analyzer to store liquid used for analysis, provided at an upper end with an opening for accepting the liquid, and provided on an upper end side of a side surface with an overflow portion to overflow the liquid outwardly; a liquid reservoir holding member for holding the liquid reservoir; and a discharge flow path for discharging the liquid allowed to overflow from the overflow portion of the liquid reservoir, wherein the overflow portion includes a flow path inlet disposed on an upper end side of the side surface of the reservoir, a flow path bottom surface monotonously inclined obliquely downward from the flow path inlet, and a flow path side wall disposed on a lateral side of the flow path bottom surface and shaped to have a cutout on a flow path outlet side, and a flow path outlet of the overflow portion projects into the discharge flow path so as to be located closer to an inner circumferential side of the discharge flow path than to an inner circumferential surface side of an outer wall of the discharge flow path and below an upper end of the outer wall of the discharge flow path.

Effect of the Invention

According to the present invention, the users' labor during operation can be saved, without need to increase the number of components.

MODES FOR CARRYING OUT THE INVENTION

Figure 1:
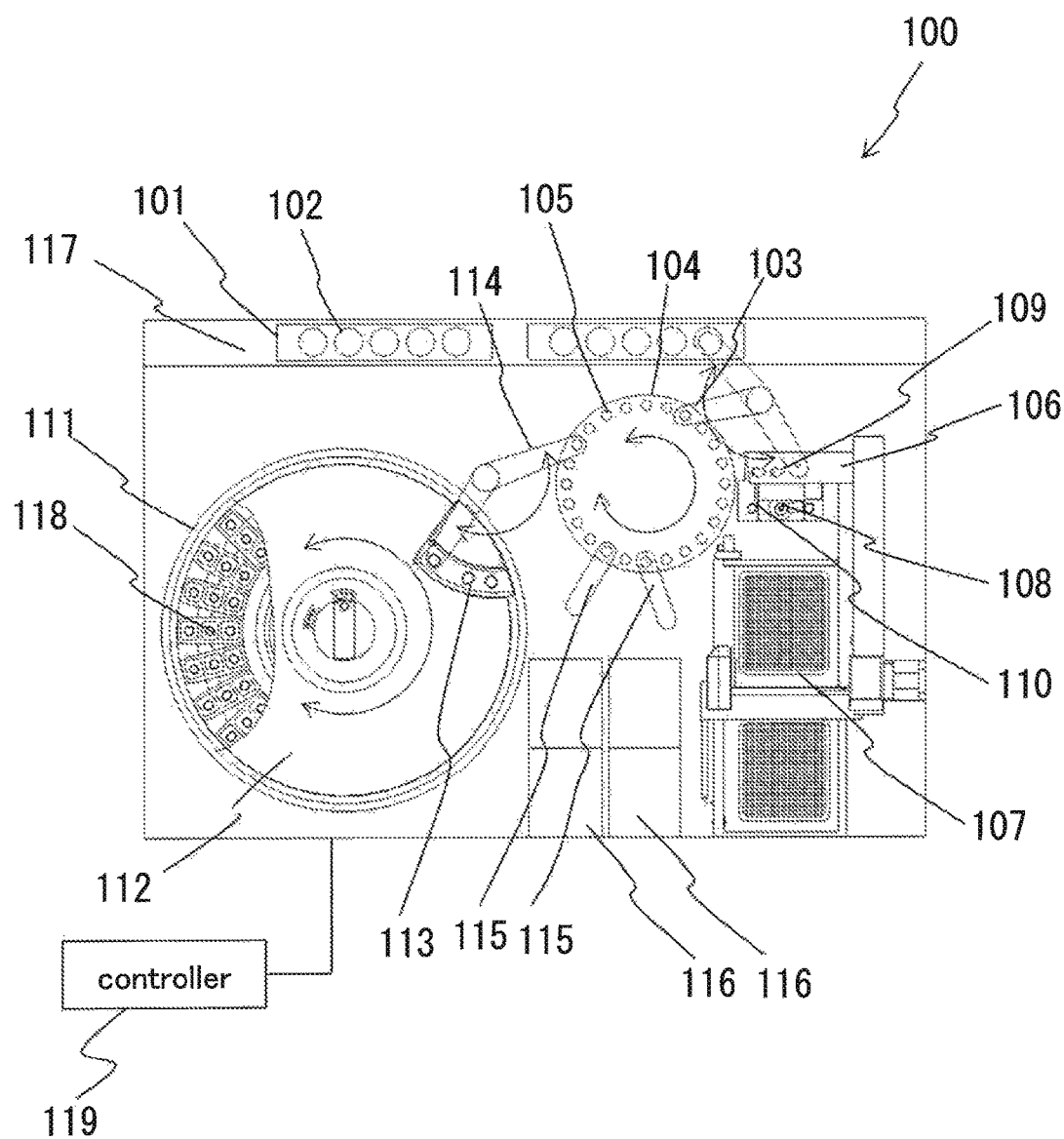
FIG. 1 is a plan view showing a general configuration of an automated analyzer according to a first embodiment of the present invention.

Embodiments of an automated analyzer and a liquid reservoir according to the present invention will be described below, referring to the drawings.

First Embodiment

A first embodiment of an automated analyzer and a liquid reservoir according to the present invention will be described, referring to FIGS. 1 to 9C.

(1) General Configuration and Flow of Analysis

In the first place, referring to FIG. 1, the general configuration of the automated analyzer according to this embodiment will be outlined. FIG. 1 is a plan view showing the general configuration of an automated analyzer according to the first embodiment of the present invention.

As illustrated in FIG. 1, an automated analyzer 100 in this embodiment includes racks 101, a sample pipetting nozzle 103, an incubator disk 104, reaction vessels 105, a reaction vessel transfer mechanism 106, 115, a sample pipetting chip/reaction vessel holding member 107, a reaction vessel stirring mechanism 108, a discarding portion 109, a sample pipetting chip mounting position 110, a reagent disk 111, a reagent disk cover 112, a reagent disk cover opening 113, a reagent pipetting nozzle 114, detection units 116, a rack transfer line 117, and a control unit 119.

The racks 101 transfer sample vessels 102 in which samples are contained. The sample pipetting nozzle 103 is a nozzle for aspirating the sample contained in the sample vessel 102 and discharging the sample into the reaction vessel 105. The incubator disk 104 is a disk for performing reactions between the samples and reagents at a constant temperature. A plurality of the reaction vessels 105 are held on the incubator disk 104, and serve as sites in each of which the sample and a reagent are mixed and reacted with each other. The reaction vessel transfer mechanism 106, 115 transfers the reaction vessels 105. The sample pipetting chip/reaction vessel holding member 107 takes custody of disposable chips and reaction vessels 105 to be used for sample pipetting. The reaction vessel stirring mechanism 108 stirs liquids in the reaction vessels 105. The discarding portion 109 is a site for discarding the sample pipetting chips and the reaction vessels 105 which have been used. The sample pipetting chip mounting position 110 is a site for mounting an unused sample pipetting chip to the sample pipetting nozzle 103. The reagent disk 111 is a disk for keep reagent bottles 118 in custody, and is kept cold for restraining deterioration of the reagents. The reagent disk cover 112 is a cover for heat-insulating the inside of the reagent disk 111 (note that in FIG. 1, a left portion is shown in a partly broken-away state for explanation). The reagent pipetting nozzle 114 is a nozzle for aspirating the reagent kept in custody in the reagent bottle 118 in the reagent disk 111 and discharging the reagent into the reaction vessel 105. The detection units 116 (in this embodiment, it is assumed that two detection units are mounted on a single automated analyzer) perform detection by use of a liquid having undergone a reaction in the reaction vessel 105. The rack transfer line 117 is a line for transferring the racks 101. The control unit 119 controls various operations of each of the above-mentioned members. Note that the detection unit 116 will be described in detail later.

In the next place, a general flow of analysis in the automated analyzer according to this embodiment will be outlined. Note that consumable parts such as the reagent bottles 118, sample pipetting chips and reaction vessels 105 which are necessary for analysis are installed respectively in the reagent disk 111 and the sample pipetting chip/reaction vessel holding member 107 in the analyzer by the user, prior to analysis.

First, in a state in which samples to be analyzed are contained in the sample vessels 102, the user places the rack 101 into the automated analyzer. Here, unused reaction vessels 105 and sample pipetting chips are transferred to the incubator disk 104 and the sample pipetting chip mounting position 110 by the reaction vessel transfer mechanism 106 of the analyzer.

Thereafter, the reagent pipetting nozzle 114 makes an access to the inside of the reagent disk 111 through the opening 113 of the reagent disk cover 112, whereby a reagent kept in custody in the reagent bottle 118 is pipetted into the reaction vessel 105 on the incubator disk 104.

Thereafter, when the rack 101 passes the rack transfer line 117 to reach a sample pipetting position, the sample is pipetted into the reaction vessel 105 by the sample pipetting nozzle 103, and a reaction between the sample and the reagent starts. The reaction here means, for example, that a luminescence-labeled antibody capable of reacting only with a specific antigen in the sample is used as a reagent and that the sample and the luminescence-labeled antibody are bound to each other through an antigen-antibody reaction. In this case, a mixture of the sample and the reagent is aspirated and discharged in the sample pipetting chip, whereby stirring of the sample and the reagent is conducted. After this operation is completed, the sample pipetting nozzle is discarded to the discarding portion 109 by the reaction vessel transfer mechanism 106.

In addition, after the reaction between the sample and the reagent starts, a reaction may be performed by further adding another reagent at a specific timing. For example, there is a process in which a magnetic bead with an antibody bound to a surface thereof is further bound to the aforementioned antigen. The reagent pipetting operation in this case is conducted in the same manner as above, but a stirring operation after the addition of the reagent is performed by the reaction vessel stirring mechanism 108.

After the reaction between the sample and the reagent is completed, the reaction vessel 105 is transferred by the reaction vessel transfer mechanism 115 to the detection unit 116, where a detecting operation using the reaction mixture (the liquid mixture obtained upon completion of the reaction between the sample and the reagent) is conducted in the reaction vessel 105, and the result of analysis is informed to the user. The detecting operation will be described in detail later.

After the detecting operation is completed, the reaction vessel 105 is discarded to the discarding portion 109 by the reaction vessel transfer mechanism 106, 115.

(2) Detection Unit Peripheral Configuration

Figure 2:
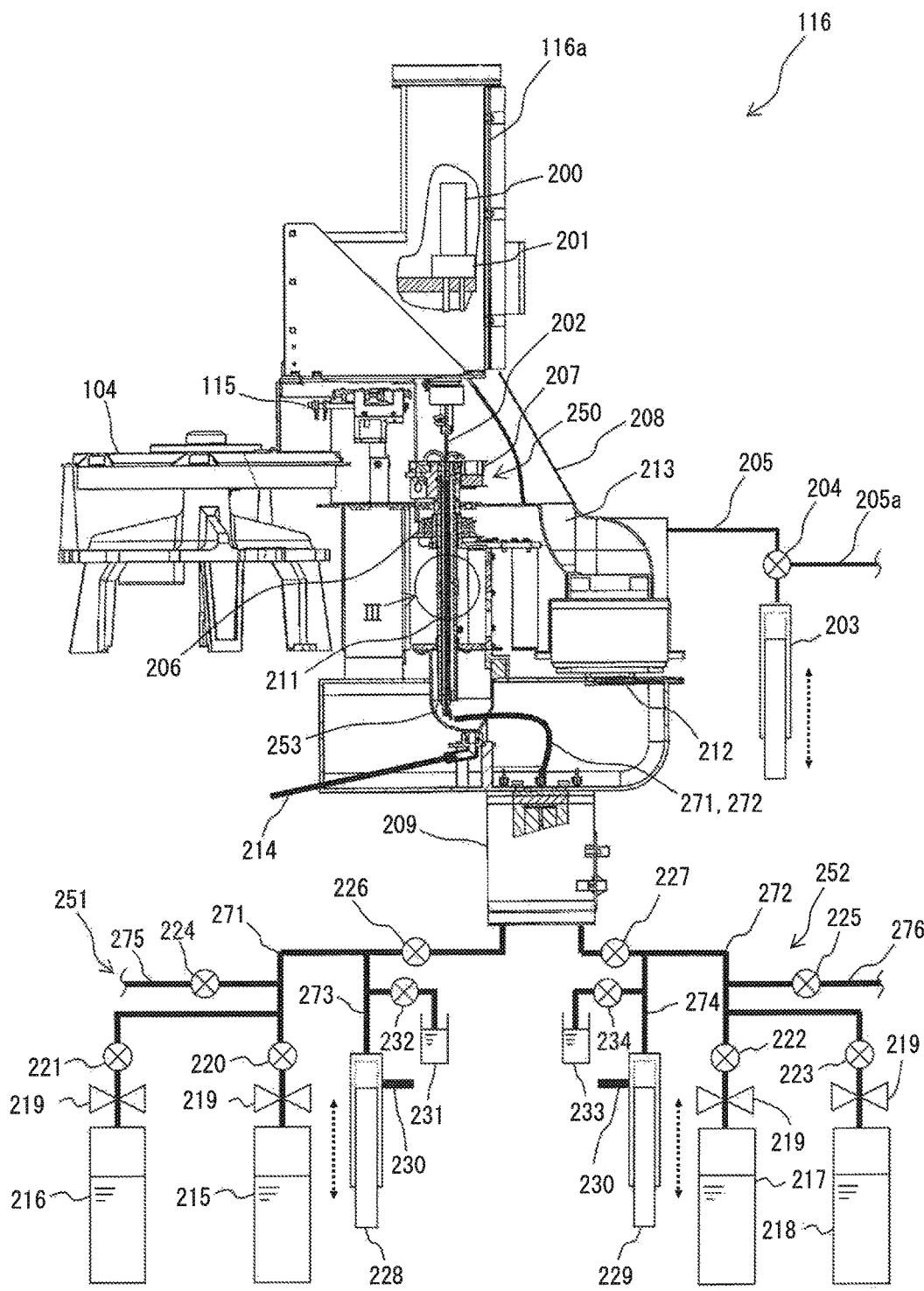
FIG. 2 shows a schematic configuration (partly including a section) of a detection unit provided in the automated analyzer according to the first embodiment and the vicinity thereof.

FIG. 2 shows a schematic configuration of the detection unit 116 in the automated analyzer 100 according to this embodiment and its peripheral members.

As shown in FIG. 2, the detection unit 116 in this embodiment includes a detection unit main body 116a, a signal detector 200, a flow cell 201, an aspiration nozzle 202, a reaction liquid syringe 203, a detection flow path selector valve 204, a detection system flow path 205, a detection system waste liquid flow path 205a, a liquid reservoir holding member 207, a liquid reservoir holding member driving mechanism 206, a detection unit cover 208, a liquid temperature regulator 209, a liquid flow path 211, an air conditioner 212, an air jet port 213, a liquid discarding flow path 214, a liquid tank 253, a reaction assistance liquid flow path 271, and a cleaning liquid flow path 272. Note that the liquid reservoir holding member driving mechanism 206, the liquid reservoir holding member 207 and the liquid flow path 211 are together generically referred to as a reservoir unit 250.

The detection unit main body 116a is a member for performing detection. The signal detector 200 is a detector for performing signal detection; in this embodiment, a photomultiplier tube for detecting a luminescence signal is used. The flow cell 201 is a cell for performing a detecting reaction and converting a chemical property into a detectable signal; in this embodiment, a cell in which a system for bringing a luminescence labeling substance and a reaction assistance liquid into reaction to generate a luminescence signal is adopted is used. The aspiration nozzle 202 and the reaction liquid syringe 203 are members for aspirating a reaction liquid in the reaction vessel 105 and transferring the reaction liquid to the flow cell 201. The liquid reservoir holding member 207 is a member for holding liquid reservoirs (reservoirs) for temporarily storing a cleaning liquid and the like and the reaction vessel 105 (details will be described later). The liquid reservoir holding member driving mechanism 206 is a mechanism for driving the liquid reservoir holding member 207 to move vertically and to rotate. The liquid temperature regulator 209 is a device for regulating the temperature of the liquid supplied to the liquid reservoir. The liquid flow path 211 is a flow path formed such that liquid can pass therethrough (details will be described later). The air conditioner 212 is a device for regulating the temperature in the space inside the detection unit cover 208. The air jet port 213 is an opening for introducing air, coming from the air conditioner 212 and regulated in temperature, to the inside of the detection unit cover 208. The liquid discarding flow path 214 and the liquid tank 253 are members for discarding the liquid having passed the liquid flow path 211. The reaction assistance liquid flow path 271 is a flow path for supplying a reaction assistance liquid to the liquid reservoir, and the cleaning liquid flow path 272 is a flow path for supplying a cleaning liquid to the liquid reservoir.

In addition, the detection unit 116 of the automated analyzer 100 includes reaction assistance liquid bottles 215, 216 (in this embodiment, two reaction assistance liquid bottles can be arranged), liquid deficiency detection sensors 219, reaction assistance liquid flow path selector valves 220, 221, 224, 226, 232, a reaction assistance liquid syringe 228, a system water supply flow path 230, a reaction assistance liquid diluting fluid bottle 231, flow paths 271, 273 for a reaction assistance liquid, and a discarding flow path 275, as a flow path system for supplying the reaction assistance liquid to the reaction assistance liquid flow path 271.

The reaction assistance liquid syringe 228 is a syringe for transferring the reaction assistance liquid. The system water supply flow path 230 is a flow path for injecting system water (syringe flow path water). The reaction assistance liquid diluting fluid bottle 231 holds a diluting fluid for diluting the reaction assistance liquid. The flow paths 271 and 273 are members for supplying and discarding the reaction assistance liquid. The discarding flow path 275 is a flow path for discarding the reaction assistance liquid.

Note that the reaction assistance liquid diluting fluid is not limited as to its components, so long as it can dilute reactants contained in the reaction assistance liquid, and, for example, water is preferable for use as the reaction assistance liquid diluting fluid. Besides, in this case, means may be adopted such that a diluting fluid bottle is not used and that water is supplied from the system water supply flow path 230.

Furthermore, the detection unit 116 of the automated analyzer 100 includes cleaning liquid bottles 217, 218 (in this embodiment, two cleaning liquid bottles can be arranged), liquid deficiency detection sensors 219, cleaning liquid flow path selector valves 222, 223, 225, 227, 234, a cleaning liquid syringe 229, a system water supply flow path 230, a cleaning liquid diluting fluid bottle 233, flow paths 272, 274 for the cleaning liquid, and a discarding flow path 276, as a flow path system for supplying the cleaning liquid to the cleaning liquid flow path 272.

The cleaning liquid syringe 229 is a syringe for transferring the cleaning liquid. The system water supply flow path 230 is a flow path for injecting system water. The cleaning liquid diluting fluid bottle 233 is a bottle holding a liquid for diluting the cleaning liquid. The flow paths 272 and 274 are flow paths for supplying and discarding the cleaning liquid. The discarding flow path 276 is a flow path for discarding the cleaning liquid.

Note that the cleaning liquid diluting fluid is not restricted as to its components, so long as it can dilute reactants contained in the cleaning liquid, and, for example, water is preferable for use as the cleaning liquid diluting fluid. Besides, in this case, means may be adopted such that a diluting fluid bottle is not used and that water is supplied from the system water supply flow path 230.

Figure 3:
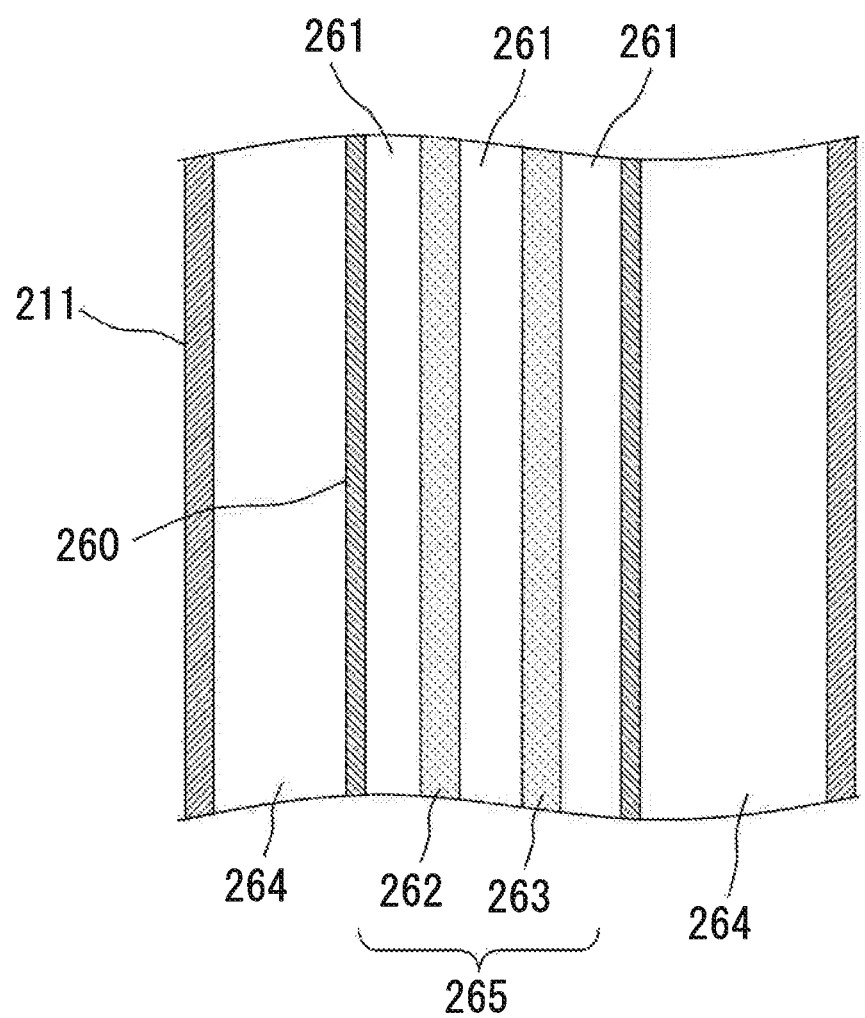
FIG. 3 is an enlarged view of part III of FIG. 2, and is a longitudinal sectional view of the vicinity of a liquid flow path.

FIG. 3 is an enlarged view of part III of FIG. 2, and is a longitudinal sectional view of the liquid flow path 211.

As shown in FIG. 3, the liquid flow path 211 has a double-pipe structure in which an inner pipe 260 is passed on an inner circumferential side thereof. The liquid flow path 211 has a supply flow path 265 inside the inner pipe 260, a drain flow path 264 outside the inner pipe 260, and a hollow portion 261.

The drain flow path 264 is a flow path for discharging liquid that overflows from overflow portions 502 of a reaction assistance liquid reservoir 404 and a cleaning liquid reservoir 405 which will be described later. The drain flow path 264 is formed on an outer circumferential side of the inner pipe 260 in the liquid flow path 211, and is connected to the liquid tank 253.

A reaction assistance liquid pipe 262 and a cleaning liquid pipe 263 are passed on an inner circumferential side of the inner pipe 260. The reaction assistance liquid pipe 262 is connected to the aforementioned reaction assistance liquid flow path 271, while the cleaning liquid pipe 263 is connected to the aforementioned cleaning liquid flow path 272.

Figure 4:
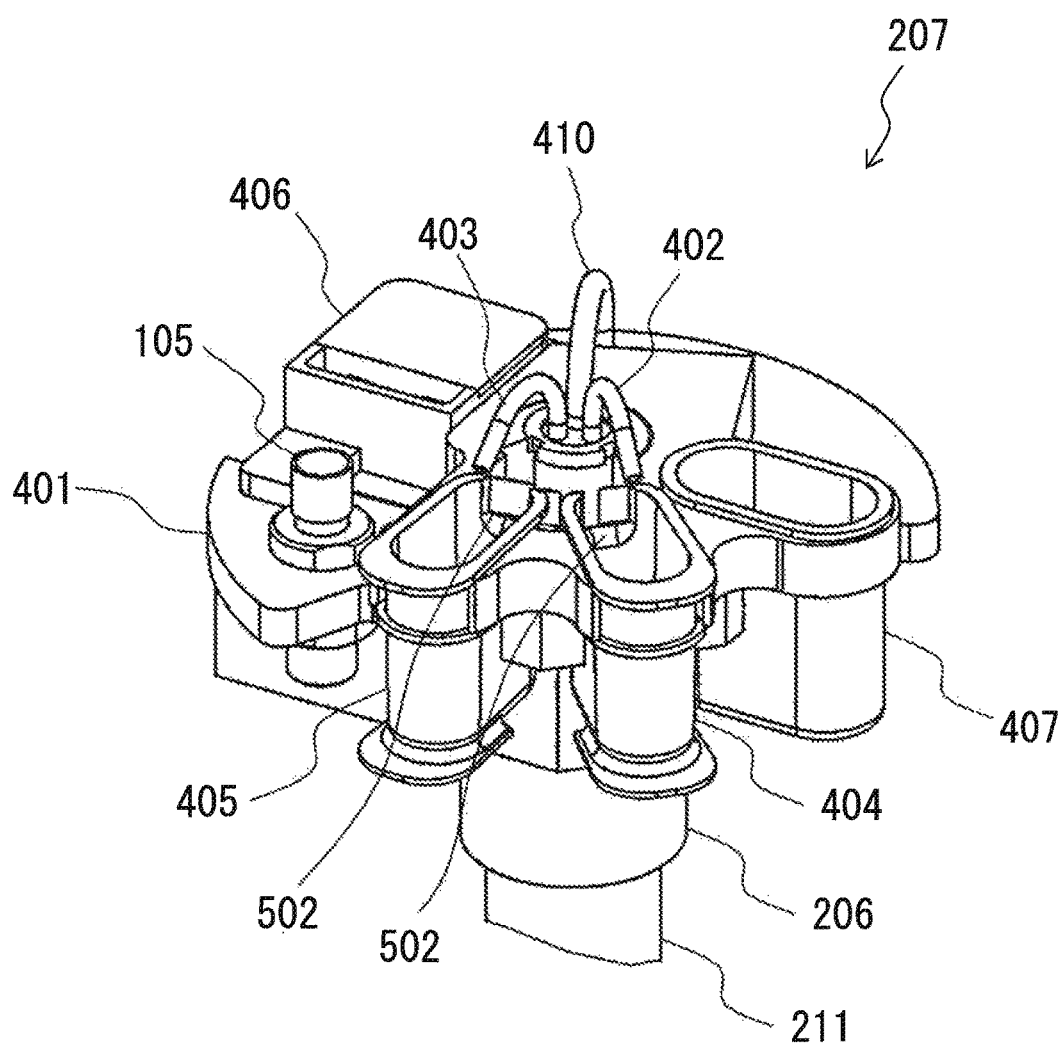
FIG. 4 is a perspective view of a reservoir holding member provided in the automated analyzer according to the first embodiment.

FIG. 4 is a perspective view of the liquid reservoir holding member 207.

In FIG. 4, the liquid reservoir holding member 207 is a member for holding the reaction assistance liquid reservoir 404, the cleaning liquid reservoir 405 and a special cleaning liquid reservoir 407, and includes a reaction assistance liquid supply nozzle 402 connected to the aforementioned reaction assistance liquid pipe 262, a cleaning liquid supply nozzle 403 connected to the cleaning liquid pipe 263, a pipe 410 connected to the hollow portion 261, a reaction vessel installation portion 401 for installing the reaction vessel 105, and an aspiration nozzle cleaning tank 406 for cleaning the aspiration nozzle 202.

Here, the reaction assistance liquid reservoir 404 is a reservoir for temporarily storing the reaction assistance liquid. The cleaning liquid reservoir 405 is a reservoir for temporarily storing the cleaning liquid. The special cleaning liquid reservoir 407 is a reservoir for holding a special cleaning liquid for cleaning the detection flow path system by use of a special cleaning liquid at the time of scheduled maintenance or the like. Note that the reaction assistance liquid reservoir 404, the cleaning liquid reservoir 405 and the special cleaning liquid reservoir 407 can be attached to and detached from the reservoir holding member 207. In this embodiment, the reaction assistance liquid reservoir 404 and the cleaning liquid reservoir 405 are together generically referred to as liquid reservoir.

The reaction assistance liquid supply nozzle 402 and the cleaning liquid supply nozzle 403 are structured to extend upward from their portions of connection with the liquid flow path 211 and then have their tips turned back downward. Furthermore, the reaction assistance liquid supply nozzle 402, the cleaning liquid supply nozzle 403 and the pipe 410 are held by the liquid reservoir holding member 207 or the liquid reservoir holding member driving mechanism 206, such that the positional relationships between the reaction assistance liquid reservoir 404, the cleaning liquid reservoir 405 and the cleaning tank 406 remain unchanged even when the liquid reservoir holding member 207 is rotated by the liquid reservoir holding member driving mechanism 206.

(3) Detection Unit Operation

Figure 5:
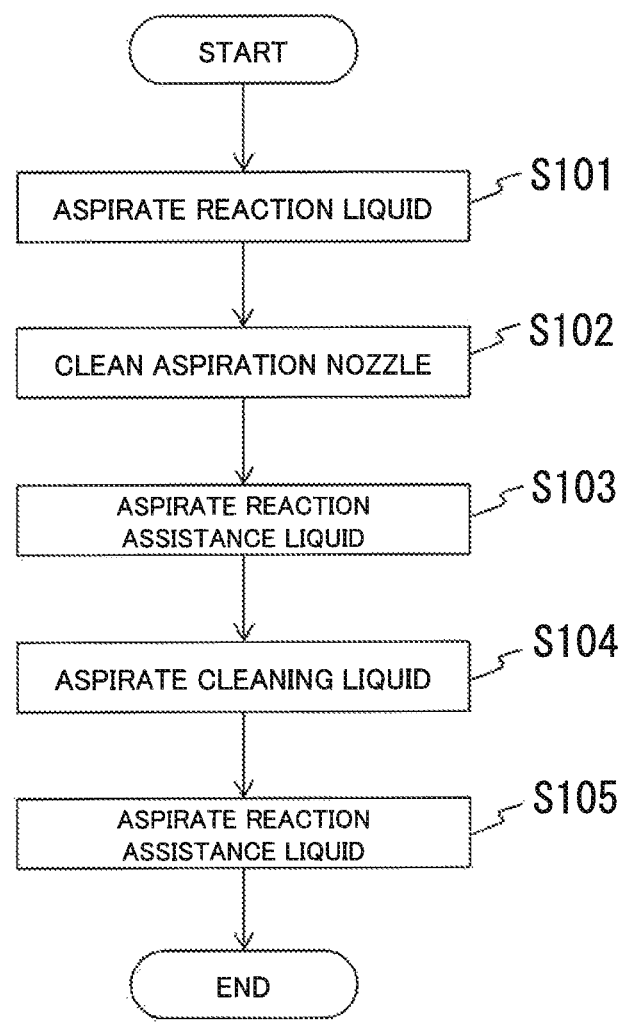
FIG. 5 is a flow chart concerning an operation of the detection unit in the automated analyzer according to the first embodiment.

Referring to FIG. 5, a flow of operation of the detection unit when the automated analyzer 100 performs a series of detecting operations will be simply described below. The operation of the detection unit is composed of five steps shown in FIG. 5.

(Step S101)

Step S101 is a procedure for aspirating a reaction liquid and transferring it to the flow cell 201.

In this step S101, the control unit 119 first outputs command signals to the incubator disk 104, the reaction vessel transfer mechanism 115 and the holding member driving mechanism 206, to transfer a predetermined reaction vessel 105 on the incubator disk 104 onto a reaction vessel installation portion 401 of the liquid reservoir holding member 207, to rotate the reservoir holding member 207, and thereby to move the reaction vessel 105 to a position directly below the aspiration nozzle 202. Thereafter, the reservoir holding member 207 is raised, to insert the aspiration nozzle 202 into the reaction vessel 105.

When the aspiration nozzle 202 has been inserted into the reaction vessel 105, the control unit 119 transfers the reaction liquid into the flow cell 201 via the aspiration nozzle 202.

(Step S102)

Step S102 is a procedure for cleaning the aspiration nozzle 202 to remove the reaction liquid adhered to the aspiration nozzle 202.

When an operation of aspirating the reaction liquid by the aspiration nozzle 202 in step S101 is finished, the control unit 119 lowers the liquid reservoir holding member 207, to draw the aspiration nozzle 202 out of the reaction vessel 105. Next, the liquid reservoir holding member 207 is rotated, to move the aspiration nozzle cleaning tank 406 to a position directly below the aspiration nozzle 202. Thereafter, the reservoir holding member 207 is moved upward, to insert the aspiration nozzle 202 into the aspiration nozzle cleaning tank 406. In the cleaning tank 406, cleaning water supplied from a cleaning liquid supply hole (not shown) is discharged toward the aspiration nozzle 202, and is discharged into the drain flow path 264 while removing the reaction liquid adhered to an outer circumferential portion of the aspiration nozzle 202.

(Step S103)

Step S103 is a procedure for aspirating the reaction assistance liquid by the aspiration nozzle 202 and transferring the reaction assistance liquid to the flow cell 201.

When cleaning of the aspiration nozzle 202 in step S102 is finished, the control unit 119 lowers the liquid reservoir holding member 207, to draw the aspiration nozzle 202 out of the cleaning tank 406. Next, the liquid reservoir holding member 207 is rotated and moved to move the reaction assistance liquid reservoir 404 to a position directly below the aspiration nozzle 202, and the reservoir holding member 207 is raised to insert the aspiration nozzle 202 into the reaction assistance liquid reservoir 404. Thereafter, the reaction assistance liquid is aspirated through the aspiration nozzle 202. Then, the reaction liquid and the reaction assistance liquid are reacted with each other in the flow cell 201, to detect luminescence from the luminescence labeling substance.

Note that the control unit 119 supplements the same amount of the reaction assistance liquid as that aspirated in the this-time aspirating operation into the reaction assistance liquid reservoir 404 via the reaction assistance liquid supply nozzle 402 by the time of next-time aspiration of the reaction assistance liquid (for example, simultaneously with or immediately after the aspiration by the aspiration nozzle 202). By this, the amount of the liquid in the reaction assistance liquid reservoir 404 is maintained at a minimum and constant capacity. With the liquid amount maintained at the minimum and constant capacity, spilling or bubbling of the liquid in each liquid reservoir during movement is restrained, stabilization of rotation and vertical movements of the liquid reservoir holding member 207 is realized, and analysis cycle efficiency and analysis performance can be enhanced.

(Step S104)

Step S104 is a procedure for aspirating the cleaning liquid through the aspiration nozzle 202 and cleaning the flow cell 201.

When the detecting operation in step S103 is finished and this procedure is started, the control unit 119 lowers the liquid reservoir holding member 207, to draw the aspiration nozzle 202 out of the reaction assistance liquid reservoir 404. Next, the liquid reservoir holding member 207 is rotated to move the cleaning liquid reservoir 405 to a position directly below the aspiration nozzle 202, and the liquid reservoir holding member 207 is raised to insert the aspiration nozzle 202 into the cleaning liquid reservoir 405. Thereafter, the cleaning liquid is aspirated by the aspiration nozzle 202 in the same manner as above, and the inside of the flow cell 201 is cleaned. In the same manner as the supplement of the reaction assistance liquid, the same amount of the cleaning liquid as that aspirated by the aspiration nozzle 202 is supplied into the cleaning liquid reservoir 405 via the cleaning liquid supply nozzle 403, by the time of next-time operation of aspirating the cleaning liquid (for example, simultaneously with or immediately after the aspiration by the aspiration nozzle 202).

(Step S105)

Step S105 is a procedure concerning preparation for a next-time detecting operation.

When the aspiration of the cleaning liquid in step S104 is finished, the liquid reservoir holding member 207 is lowered, to draw the aspiration nozzle 202 out of the cleaning liquid reservoir 405. Next, the liquid reservoir holding member 207 is rotated to move the reaction assistance liquid reservoir 404 to a position directly below the aspiration nozzle 202, and the reservoir holding member 207 is raised to insert the aspiration nozzle 202 into the reaction assistance liquid reservoir 404. Then, the reaction assistance liquid is aspirated through the aspiration nozzle 202, and the cleaning liquid remaining inside the flow cell 201 is replaced by the reaction assistance liquid. In addition, the next reaction vessel is transferred from the incubator disk 104 onto the reaction vessel installation portion 401, and a preparing step for the next detecting operation is conducted. Note that in this procedure, also, the control unit 119 supplements the reaction assistance liquid into the reaction assistance liquid reservoir 404 by the time of next-time aspiration of the reaction assistance liquid.

(4) Liquid Replacing Operation

Figure 6:
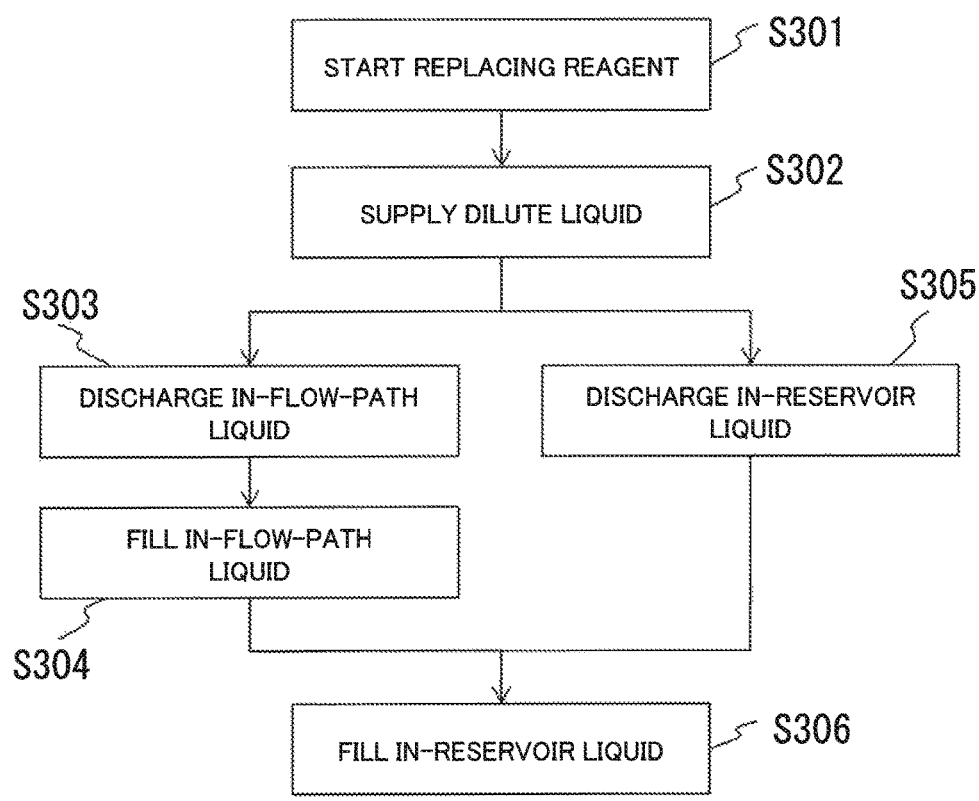
FIG. 6 is a flow chart concerning a liquid replacement operation in a liquid reservoir of the automated analyzer according to the first embodiment.

Further, referring to FIG. 6, an operation of replacing the liquids in the reaction assistance liquid reservoir 404, the cleaning liquid reservoir 405, the reaction assistance liquid pipe 262, the cleaning liquid pipe 263 and the like, in the case where the reaction liquid or the cleaning liquid is left on the liquid reservoir and deteriorated after the lapse of a predetermined period of time or the like cases, will be described.

(Step S301)

When replacement of the liquid in the liquid reservoir and the flow path is commanded by the operator through a console (not shown) of the control unit 119, the control unit 119 checks the states of the devices, in order to dilute each of the liquids inside the reaction assistance liquid reservoir 404 and the cleaning liquid reservoir 405, and thereafter transfers the procedure to step S302 which is a diluting fluid supply process.

(Step S302)

When the procedure shifts to step S302, a diluting fluid is supplied from a reaction assistance liquid supply system 251 into the reaction assistance liquid reservoir 404, and a diluting fluid is supplied from a cleaning liquid supply system 252 into the cleaning liquid reservoir 405. Specifically, operations are conducted as follows.

First, in the reaction assistance liquid supply system 251, in a state in which the flow path selector valves 220, 221, 224, 226 are closed and the flow path selector valve 232 is open, a aspirating operation of the liquid transfer syringe 228 is conducted. By this, the diluting fluid in the diluting fluid bottle 231 is aspirated into the liquid transfer syringe 228. Thereafter, in state in which the flow path selector valves 220, 221, 224, 232 are closed and the flow path selector valve 226 is open, a discharging operation of the liquid transfer syringe 228 is conducted. By this, the diluting fluid is supplied into the reaction assistance liquid reservoir 404 through the reaction assistance liquid flow path 271 and the reaction assistance liquid supply nozzle 402. This operation is repeated until a prescribed amount of the diluting fluid is supplied.

On the other hand, a command for a similar operation is given also to the cleaning liquid supply system 252. Specifically, in the cleaning liquid supply system 252, in a state in which the flow path selector valves 222, 223, 225, 227 are closed and the flow path selector valve 234 is open, a aspirating operation of the liquid transfer syringe 229 is conducted. By this, the diluting fluid in the diluting fluid bottle 233 is aspirated into the liquid transfer syringe 229. Thereafter, in a state in which the flow path selector valves 222, 223, 225, 234 are closed and the flow path selector valve 227 is open, a discharging operation of the liquid transfer syringe 229 is conducted. By this, the diluting fluid is supplied into the cleaning liquid reservoir 405 through the cleaning liquid flow path 272 and the cleaning liquid supply nozzle 403. This operation is repeated until a prescribed amount of the diluting fluid is supplied.

By these operations, the old reaction assistance liquid remaining in the reaction assistance liquid flow path 271 is pushed out into the reaction assistance liquid reservoir 404 by the diluting fluid, and the old cleaning liquid remaining in the cleaning liquid flow path 272 is pushed out into the cleaning liquid reservoir 405 by the diluting fluid. During this process, the diluting fluids are continuously supplied in excess of the capacities of the reaction assistance liquid reservoir 404 and the cleaning liquid reservoir 405, so that the reaction assistance liquid and the cleaning liquid which are pushed aside overflow together with the diluting fluid, to be discarded into the drain flow path 264 (detailed later).

Step S303, step S304, and step S305 that follow are carried out concurrently.

(Step S303)

When the procedure shifts to step S303 which is an in-flow-path liquid discharging process, the liquids remaining in the reaction assistance liquid flow path 271 and the cleaning liquid flow path 272 are discharged.

Specifically, in the reaction assistance liquid supply system 251, for example, in a state in which the flow path selector valves 220, 221, 224, 232 are closed and the flow path selector valve 226 is open, a aspirating operation of the liquid transfer syringe 228 is carried out, to aspirate the liquid in the flow path into the liquid transfer syringe 228. Thereafter, the flow path selector valve 226 is closed, whereas the flow path selector valve 224 is opened, and a discharging operation is conducted. By this, the liquid in the flow path is discharged through the discarding flow path 275.

On the other hand, in the cleaning liquid supply system 252, for example, in a state in which the flow path selector valves 222, 223, 225, 234 are closed and the flow path selector valve 227 is open, a aspirating operation of the liquid transfer syringe 229 is carried out, to aspirate the liquid in the flow path into the liquid transfer syringe 229. Thereafter, the flow path selector valve 227 is closed, whereas the flow path selector valve 225 is opened, and a discharging operation is performed. By this, the liquid in the flow path is discharged through the discarding flow path 276.

(Step S304)

When step S303 is over, the reaction assistance liquid is filled into the flow path ranging between the reaction assistance liquid bottles 215, 216 and the discarding flow path 275, and the cleaning liquid is filled into the flow path ranging between the cleaning liquid bottles 217, 218 and the discarding flow path 276.

Specifically, in the reaction assistance liquid supply system 251, in a state in which the flow path selector valves 221, 226, 232 are closed and the flow path selector valves 220, 224 are open, a discharging operation of the liquid transfer syringe 228 is carried out, and the flow path selector valve 224 is closed when the discarding flow path 275 has been filled up with the reaction assistance liquid.

On the other hand, in the cleaning liquid supply system 252, in a state in which the flow path selector valves 223, 227, 234 are closed and the flow path selector valves 222, 225 are open, a discharging operation of the liquid transfer syringe 229 is conducted, and the flow path selector valve 225 is closed when the discarding flow path 276 has been filled up with the reaction assistance liquid.

(Step S305)

Concurrently with steps S303 and S304, step S305 which is an in-reservoir liquid discharging process is carried out. In this process, the liquids in the reaction assistance liquid reservoir 404 and the cleaning liquid reservoir 405 are discharged.

Specifically, first, the reaction assistance liquid reservoir 404 is moved to a position directly below the aspiration nozzle 202, and is raised to an aspiration position. Thereafter, the flow path selector valve 204 is opened to the detection system flow path 205 side, and the liquid in the reaction assistance liquid reservoir 404 is aspirated. When a predetermined amount of the liquid has been aspirated, the liquid reservoir holding member 207 is lowered, the liquid reservoir holding member 207 is rotated such that the cleaning tank 406 comes to a position directly below the aspiration nozzle 202, and the liquid aspirated from the reservoir is discharged into the cleaning tank 406. The liquid discharged into the cleaning tank 406 is discharged through the drain flow path 264. In addition, cleaning of the aspiration nozzle 202 is also carried out at the same time.

In the case where the liquid in the reaction assistance liquid reservoir 404 is not completely discharged by one aspirating operation, the same operation is repeated. Further, the liquid in the cleaning liquid reservoir 405 is discharged in the same manner as in the case of the reaction assistance liquid reservoir 404. Note that the order in which the processes concerning the reaction assistance liquid reservoir 404 and the cleaning liquid reservoir 405 are conducted may be reversed.

(Step S306)

When step S304 which is an in-flow-path liquid filling process and step S305 which is an in-reservoir liquid discharging process are both over, the reaction assistance liquid reservoir 404 is filled with the reaction assistance liquid, and the cleaning liquid reservoir 405 is filled with the cleaning liquid.

Specifically, in the reaction assistance liquid supply system 251 and the cleaning liquid supply system 252, in a state in which the flow path selector valves 221, 223-225, 232, 234 are closed and the flow path selector valves 220, 222, 226, 227 are open, aspirating and discharging operations of the syringes 228 and 229 are carried out. By this, the reaction assistance liquid reservoir 404 is filled with the reaction assistance liquid through the reaction assistance liquid flow path 271, and the cleaning liquid reservoir 405 is filled with the cleaning liquid through the cleaning liquid flow path 272.

(5) Liquid Discharging Operation

At the time of cleaning of dirt adhering to the liquid reservoirs or scheduled replacement of the liquid reservoirs or the like, the liquid reservoirs must be detached from the liquid reservoir holding member 207, as maintenance conducted by the user. In that instance, of steps S301 to S306 described in the "liquid replacing operation" above, the steps exclusive of step S304 and step S306 for filling the liquids are carried out, resulting in a state in which the liquids have been discharged from the liquid reservoirs. Details of a flow chart for the liquid discharging operation and each of the steps are omitted.

(6) Liquid Reservoir

Figure 7:
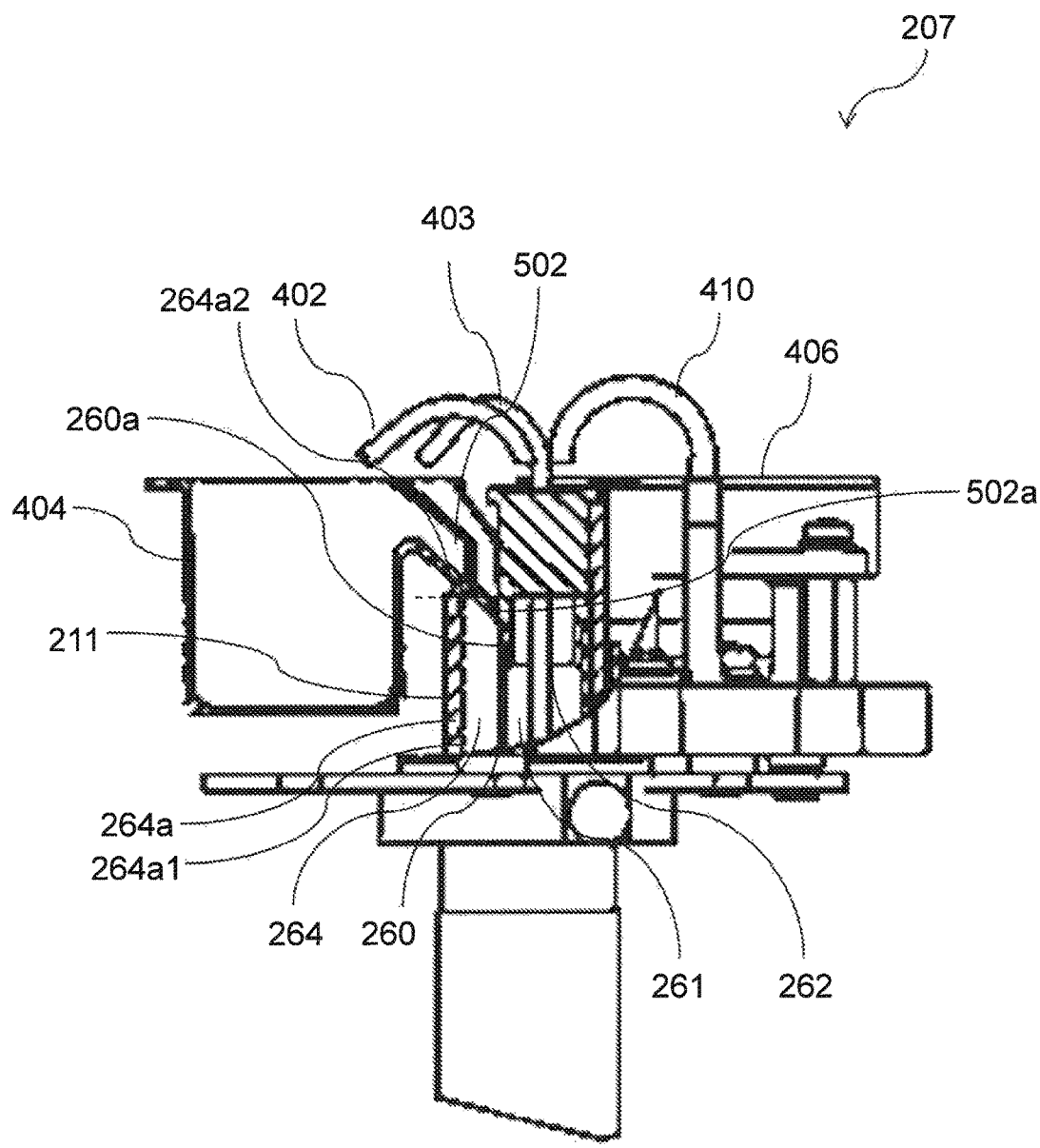
FIG. 7 is a sectional view of the vicinity of the liquid reservoir and a liquid reservoir holding member of the automated analyzer according to the first embodiment.
Figure 8A:
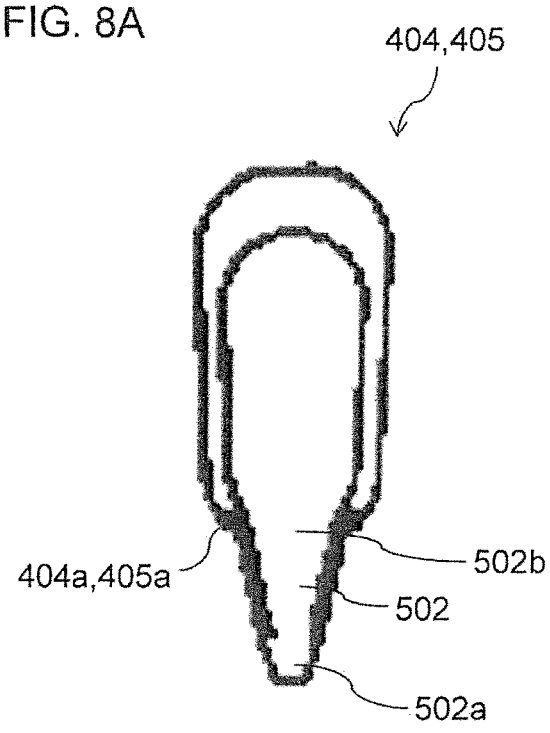
FIG. 8A shows an example of an upper surface of the liquid reservoir of the automated analyzer according to the first embodiment.
Figure 8B:
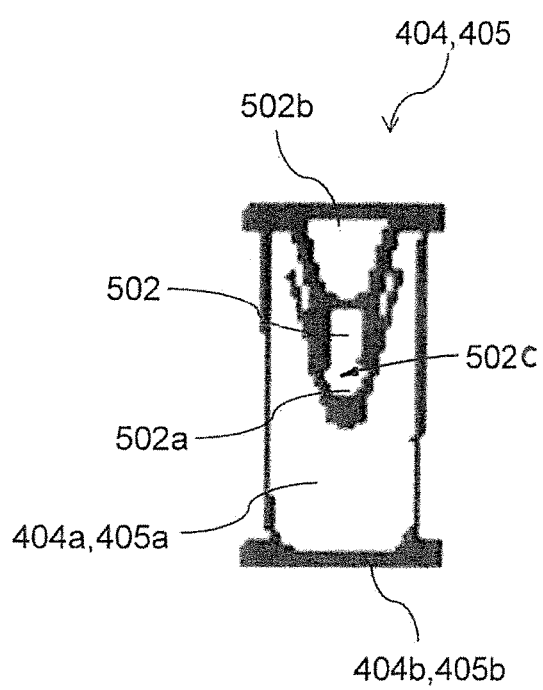
FIG. 8B shows an example of a front surface of the liquid reservoir of the automated analyzer according to the first embodiment.
Figure 8C:
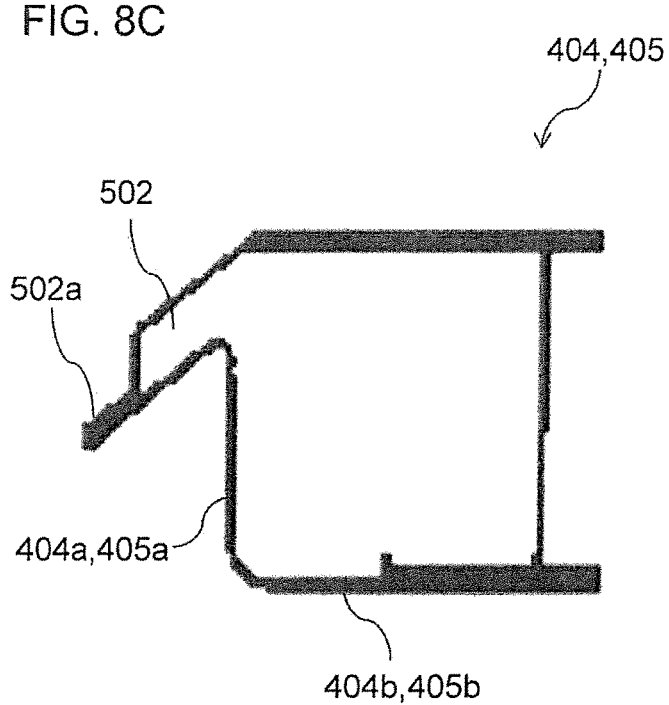
FIG. 8C shows an example of a side surface of the liquid reservoir of the automated analyzer according to the first embodiment.

Referring to FIGS. 7 and 8A to 8C, the structure of the liquid reservoirs in this embodiment will be described below. FIG. 7 is a sectional view showing the vicinity of the liquid reservoir and the liquid reservoir holding member 207 in this embodiment. FIG. 8A shows an upper surface of a preferable liquid reservoir in this embodiment, FIG. 8B shows a front surface of the same, and FIG. 8C shows a side surface of the same.

As shown in FIGS. 7 and 8A to 8C, the liquid reservoir in this embodiment (while the reaction assistance liquid reservoir 404 is shown in section in FIG. 7, the same is applicable also to the cleaning liquid reservoir 405) is a reservoir for storing a liquid which reservoir is installed in the automated analyzer 100 for storing the liquid used for analysis. The liquid reservoir includes a side surface 404a, 405a, a bottom surface 404b, 405b, and an overflow portion 502 projecting from the side surface 404a, 405a for overflowing the liquid outwardly when the liquid such as the diluting fluid is added to the reservoir as aforementioned.

As shown in FIG. 7, a flow path outlet 502a of the overflow portion 502 of the liquid reservoir 404, 405 in this embodiment projects so as to be located closer to an inner circumferential side of the drain flow path 264 than to an inner circumferential surface 264a1 side of an outer wall 264a of the drain flow path 264, which is a destination of overflow of the liquid, and projects so as to make contact with an outer wall 260a of an inner pipe 260 without making contact with the inner circumferential surface 264a1 of the outer wall 264a of the drain flow path 264. In addition, the flow path outlet 502a of the overflow portion 502 projects into the drain flow path 264 so as to be located below an upper end 264a2 of the outer wall 264a of the drain flow path 264.

Besides, as shown in FIGS. 8A to 8C, the width of the flow path outlet 502a of the overflow portion 502 is smaller than the width of a flow path inlet 502b of the overflow portion 502. An opening/cutout 502c is provided at the flow path outlet 502a on a flow path outlet side of the overflow portion 502.

In this way, in the first embodiment of the automated analyzer and the liquid reservoir of the present invention, the flow path outlet 502a of the overflow portion 502 provided in the reaction assistance liquid reservoir 404 and the cleaning liquid reservoir 405 is located on the inner side beyond the outer wall 264a of the drain flow path 264.

As a result of investigations made by the present inventors, the following has been found. In a structure in which a leading end portion of a liquid reservoir is in contact with the inner circumference of a drain flow path as disclosed in Patent Document 1, the overflow portion is in contact with the inner circumference of the liquid discharge flow path, so that the liquid passing through the overflow portion may leak to the outside through a gap at a contact portion with the drain flow path, and the liquid may enter an outer wall portion of the liquid reservoir and, further, into the liquid reservoir holding member driving mechanism thereunder by way of the outer wall of the liquid reservoir.

On the other hand, where the flow path outlet 502a of the overflow portion 502 is located on the inner side beyond the outer wall 264a of the drain flow path 264 as in this embodiment, the liquid passing through the overflow portion 502 is supplied into the drain flow path 264, so that the liquid can be securely prevented from leaking to the outside of the drain flow path 264 by coming along the outer wall 264a in the drain flow path 264. Therefore, an operation of replacing the liquid in the liquid reservoir can be enhanced in efficiency, without need to increase the number of components conspicuously, and it is possible to save the users' labor at the time of operation, inclusive of the time of maintenance such as cleaning and replacement.

Besides, a tapered shape is adopted such that the width of the flow path outlet 502a of the overflow portion 502 is smaller than the width of the flow path inlet 502b of the overflow portion 502, whereby influences of an abrupt change in shape of the overflow portion 502, such as spilling of liquid, can be avoided. In addition, access of the overflow portions 502 from a multiplicity of liquid reservoirs to the drain flow path 264 is facilitated, so that it is possible to restrain the size of the analyzer from increasing attendant on an increase in the diameter of the drain flow path 264.

Furthermore, the flow path outlet 502a of the overflow portion 502 of the liquid reservoir 404, 405 projects so as to make contact with the outer wall 260a of the inner pipe 260, whereby the liquid passing through the overflow portion 502 is reliably supplied into the drain flow path 264 by coming along the outer wall 260a, and the liquid can be securely restrained from leaking to the outside of the drain flow path 264.

Figure 9A:
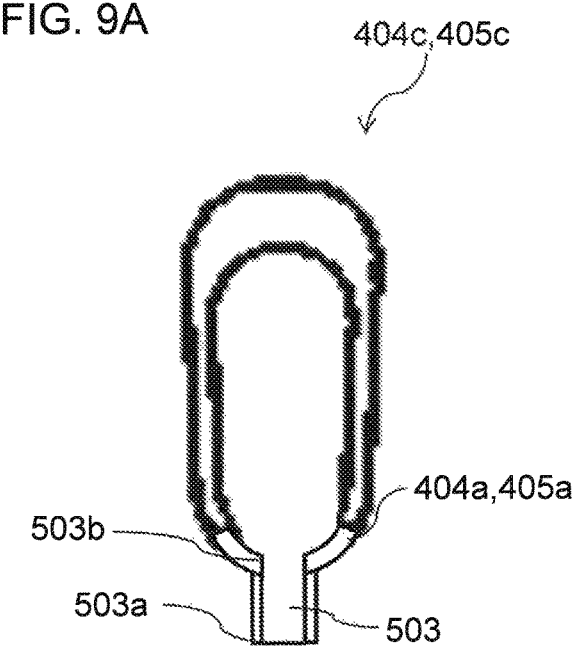
FIG. 9A shows another example of the upper surface of the liquid reservoir of the automated analyzer according to the first embodiment.
Figure 9B:
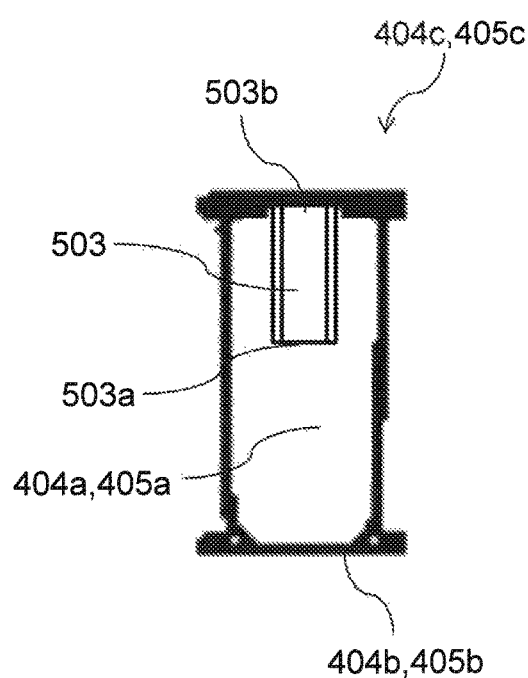
FIG. 9B shows another example of the front surface of the liquid reservoir of the automated analyzer according to the first embodiment.
Figure 9C:
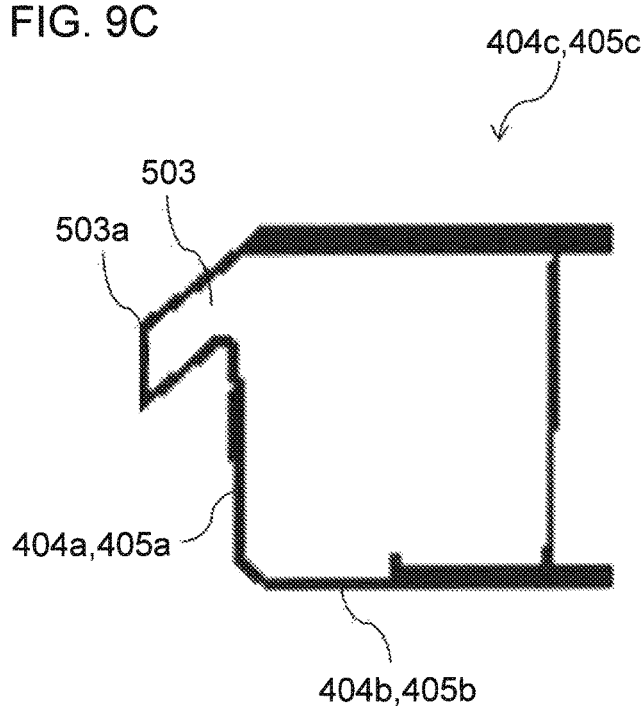
FIG. 9C shows another example of the side surface of the liquid reservoir of the automated analyzer according to the first embodiment.

Note that the effect obtained in this embodiment is observed also in the case of adopting a shape such that the width of a flow path outlet 503a of an overflow portion 503 of a liquid reservoir 404c, 405c is the same as the width of a flow path inlet 503b of the overflow portion 503, as shown in FIGS. 9A to 9C.

Second Embodiment

A second embodiment of the automated analyzer and the liquid reservoir of the present invention will be described referring to FIGS. 10 to 12. The same configurations as those in FIGS. 1 to 9C are denoted by the same reference numbers as used above, and descriptions of them are omitted.

Since the (1) general configuration of apparatus, (3) detection unit operation, (4) liquid replacing operation, (5) liquid discharging operation, and (6) liquid reservoir in the automated analyzer and the liquid reservoir according to the second embodiment of the present invention are the same as those in the first embodiment, descriptions of them are omitted.

Figure 10:
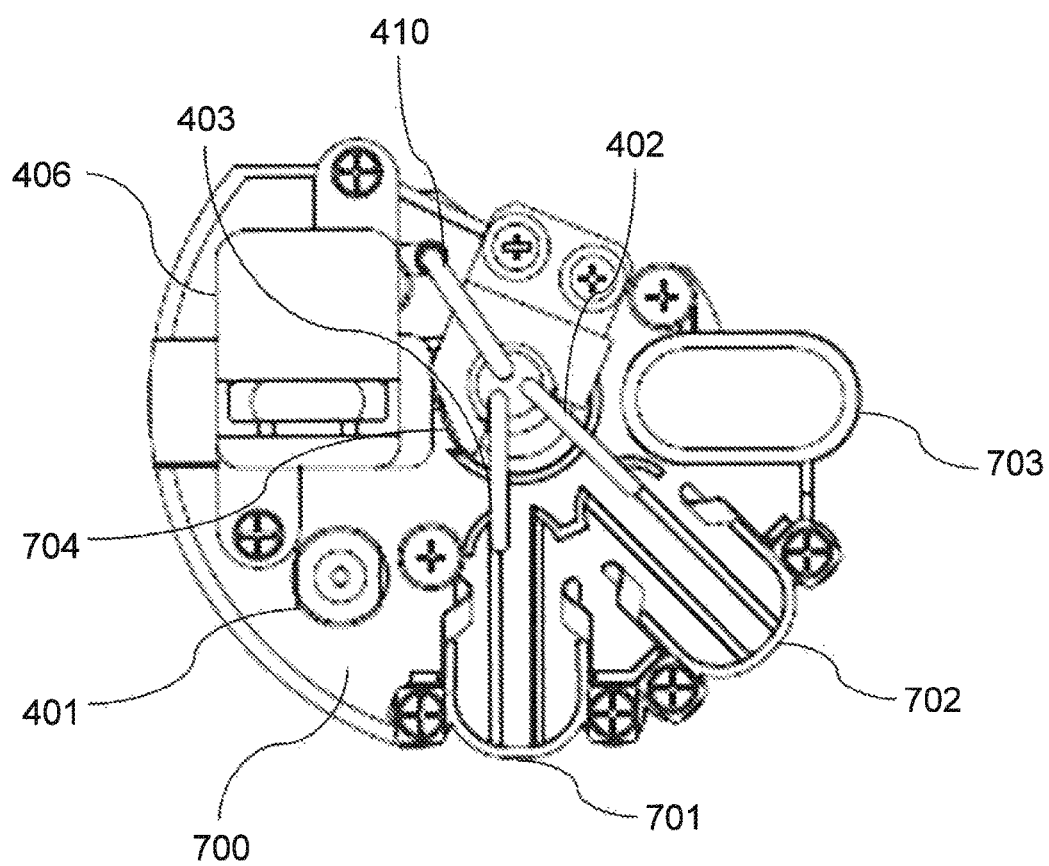
FIG. 10 is a perspective view of a liquid reservoir holding member provided in an automated analyzer according to a second embodiment of the present invention.

FIG. 10 is a top view of a liquid reservoir holding member 207 in this embodiment. In addition, FIG. 11 shows a sectional view of the vicinity of a liquid reservoir and the liquid reservoir holding member 207, and FIG. 12 shows a perspective view of the liquid reservoir holding member 207.

Figure 11:
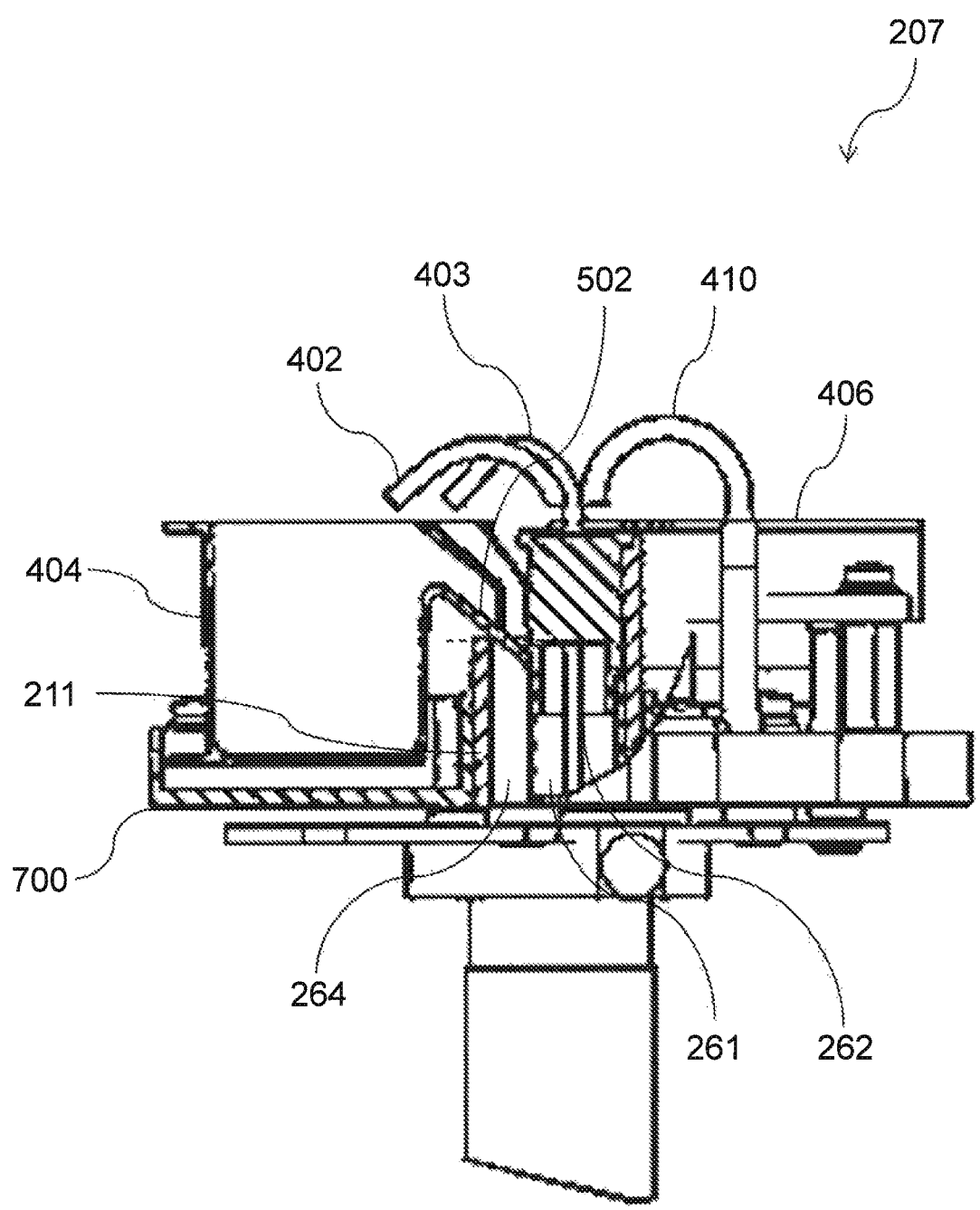
FIG. 11 is a sectional view of the vicinity of a liquid reservoir and a liquid reservoir holding member provided in the automated analyzer according to the second embodiment.
Figure 12:
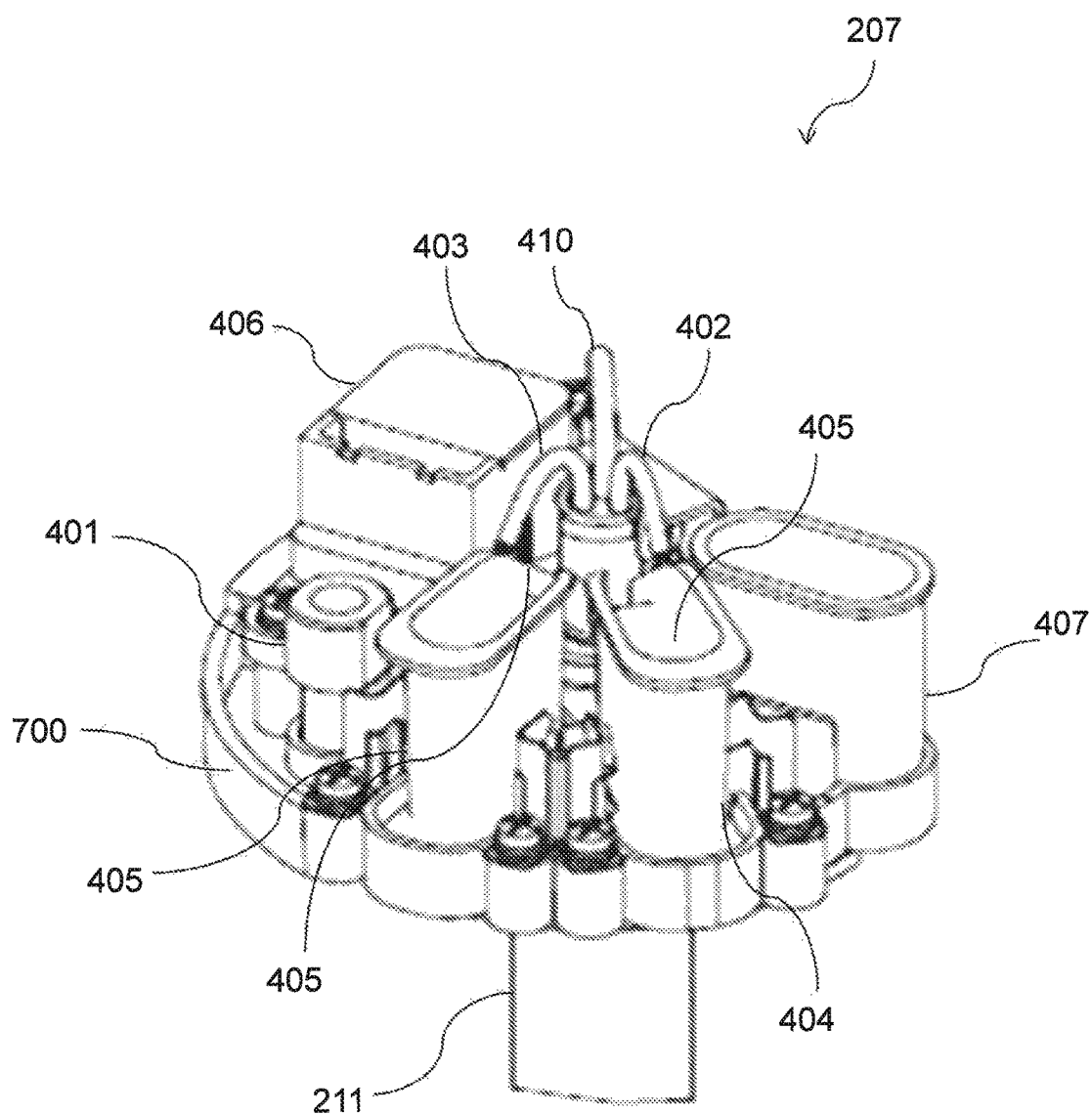
FIG. 12 is a perspective view of the liquid reservoir holding member provided in the automated analyzer according to the second embodiment.

As shown in FIGS. 10 to 12, the liquid reservoir holding member 207 in this embodiment includes a pan 700 for receiving liquid, between a liquid reservoir and a driving mechanism system.

The pan 700 is provided below a reaction assistance liquid reservoir 404 and a cleaning liquid reservoir 405 in the liquid reservoir holding member 207, and includes a cleaning liquid reservoir installation portion 701, a reaction assistance liquid reservoir installation portion 702, and a special cleaning liquid reservoir installation portion 703. These installation portions 701, 702, 703 are connected to a drain flow path port 704 directed toward a drain flow path 264. Here, each of the installation portions refers to a portion having a region capable of receiving liquid by its upper surface when the liquid comes along an outer wall of the liquid reservoir.

With such a structure as this, in the automated analyzer and the liquid reservoir in this embodiment, in the case where the liquid has leaked out into the pan 700, the liquid flows through the drain flow path port 704 into the drain flow path 264. With the pan 700 thus provided, even if the liquid in the liquid reservoir leaks from an overflow portion 502 to an outer wall of the liquid reservoir, the liquid can be restrained from entering into a liquid reservoir holding member driving mechanism 206 thereunder. Therefore, a risk that the liquid in the liquid reservoir might influence a mechanism system can be further lowered.

Here, the provision of the pan with the drain flow path port 704 is based on the consideration of, for example, a case where the user performs an operation while forgetting to install the liquid reservoir after the user's operation of detaching the liquid reservoir from the liquid reservoir holding member 207. In other words, even in a case where the liquid is supplied in a state in which the liquid reservoir is absent, the liquid is prevented from overflowing from the pan; therefore, damage to the driving system can be inhibited more assuredly, which is preferable.

However, even in a case where the pan is not provided with the drain flow path port 704, the effect of inhibiting damage to the driving system can be obtained during ordinary use. For this reason, the installation of the drain flow path port 704 is not limitative of the range of application of the present invention.

<Others>

Note that the present invention is not restricted to the above-described embodiments, but includes various modifications. The above embodiments have been described in detail for explaining the present invention in an easily understandable manner, and the embodiment of the present invention is not necessarily limited to those having all the configurations described above. In addition, part of the configuration of an embodiment may be replaced by the configuration of another embodiment, and to the configuration of an embodiment may be added the configuration of another embodiment. Further, in regard of part of the configuration of each embodiment, it is possible to apply an addition of, removal of or replacement with another configuration.

DESCRIPTION OF REFERENCE NUMBERS

100 . . . automated analyzer
119 . . . control unit
200 . . . detector
201 . . . flow cell
202 . . . aspiration nozzle
203 . . . liquid transfer syringe
205 . . . detection system flow path
231, 233 . . . diluting fluid bottle
251 . . . reaction assistance liquid supply system
252 . . . cleaning liquid supply system
260 . . . inner pipe
260a . . . outer wall
262 . . . reaction assistance liquid pipe
263 . . . cleaning liquid pipe
264 . . . drain flow path
264a . . . outer wall
264a1 . . . inner circumferential surface
264a2 . . . upper end
402 . . . reaction assistance liquid supply nozzle
403 . . . cleaning liquid supply nozzle
404 . . . reaction assistance liquid reservoir (liquid reservoir)
405 . . . cleaning liquid reservoir (liquid reservoir)
406 . . . cleaning tank
407 . . . special cleaning liquid reservoir
502 . . . overflow portion
502a, 503a . . . flow path outlet
502b, 503b . . . flow path inlet
700 . . . pan
701 . . . cleaning liquid reservoir installation portion
702 . . . reaction assistance liquid reservoir installation portion
703 . . . special cleaning liquid reservoir installation portion
704 . . . drain flow path port

The invention claimed is:

1. An apparatus for storing liquid in an automated analyzer, the apparatus comprising:

a liquid reservoir installed in the automated analyzer to store liquid used for analysis, provided at an upper end with an opening for accepting the liquid, and provided on an upper end side of a side surface with an overflow portion to overflow the liquid outwardly; and an inner pipe surrounded by an outer wall to form a discharge flow path between an outer wall surface of the inner pipe and the outer wall for discharging the liquid allowed to overflow from the overflow portion of the liquid reservoir;

wherein the inner pipe and the outer wall are disposed outside of the liquid reservoir and outside of the overflow portion of the liquid reservoir, wherein the overflow portion comprises a flow path inlet disposed on the upper end side of the side surface of the reservoir, a flow path bottom surface monotonously inclined obliquely downward from the flow path inlet, and a flow path side wall disposed on a lateral side of the flow path bottom surface and shaped to have an opening on a flow path outlet side, and a flow path outlet of the overflow portion projects through the outer wall at a location below an upper end of the outer wall, into the discharge flow path inwardly toward the outer wall surface of the inner pipe, so as to be located closer to an inner circumferential side of the discharge flow path than to an inner circumferential side of the outer wall of the discharge flow path and below an upper end of the outer wall of the discharge flow path.

2. The apparatus according to claim 1, wherein the flow path outlet of the overflow portion has a width smaller than that of the flow path inlet of the overflow portion.

3. The apparatus according to claim 1, further comprising a pan for holding the liquid having overflowed from the liquid reservoir, below the liquid reservoir.

4. The apparatus according to claim 3, wherein the pan has a pan flow path for discharging liquid to the discharge flow path.

5. The apparatus according to claim 1, wherein the inner pipe is disposed on an inner circumferential side of the outer wall so that the liquid overflowing from the overflow portion of the liquid reservoir flows through the discharge flow path formed between the outer wall surface of the inner pipe and the outer wall, and wherein the flow path outlet of the overflow portion projects into the discharge flow path so as to come into contact with the outer wall surface of the inner pipe.

* * * * *